(12) United States Patent
Iwamura

(10) Patent No.: US 7,461,255 B2
(45) Date of Patent: Dec. 2, 2008

(54) DIGITAL WATERMARK PROCESSING APPARATUS, AND DIGITAL CONTENTS DISTRIBUTION SYSTEM USING THE APPARATUS

(75) Inventor: Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1262 days.

(21) Appl. No.: 10/052,464

(22) Filed: Jan. 23, 2002

(65) Prior Publication Data

US 2002/0104003 A1    Aug. 1, 2002

(30) Foreign Application Priority Data

Jan. 31, 2001    (JP) ............... 2001-024202

(51) Int. Cl.
*H04L 9/00* (2006.01)
*G06K 15/00* (2006.01)
*G09C 3/00* (2006.01)

(52) U.S. Cl. ............ 713/176; 380/54; 380/201; 283/113; 358/3.28; 382/232

(58) Field of Classification Search ........... 713/176, 713/283; 358/283, 3.28; 283/113; 380/54
See application file for complete search history.

(56) References Cited

U.S. PATENT DOCUMENTS

| 5,600,720 | A |  | 2/1997 | Iwamura et al. ........... 380/1 |
| 5,636,292 | A |  | 6/1997 | Rhoads ................ 382/232 |
| 5,666,419 | A |  | 9/1997 | Yamamoto et al. ........ 380/28 |
| 5,937,395 | A |  | 8/1999 | Iwamura ............... 705/30 |
| 6,088,454 | A |  | 7/2000 | Nagashima et al. ....... 380/49 |
| 6,141,753 | A | * | 10/2000 | Zhao et al. ............ 713/176 |
| 6,425,081 | B1 | * | 7/2002 | Iwamura ............... 713/176 |
| 6,438,692 | B2 | * | 8/2002 | Kato et al. ............. 713/176 |
| 6,449,380 | B1 | * | 9/2002 | Acharya et al. ......... 382/100 |
| 6,523,114 | B1 | * | 2/2003 | Barton ................. 713/176 |
| 6,636,617 | B1 | * | 10/2003 | Sugahara et al. ........ 382/100 |
| 6,694,040 | B2 | * | 2/2004 | Hayashi et al. ......... 382/100 |
| 6,707,774 | B1 | * | 3/2004 | Kuroda et al. ......... 369/53.21 |
| 6,728,408 | B1 | * | 4/2004 | Echizen et al. ......... 382/232 |
| 6,748,533 | B1 | * | 6/2004 | Wu et al. .............. 713/176 |
| 6,754,365 | B1 | * | 6/2004 | Wen et al. ............. 382/100 |

(Continued)

FOREIGN PATENT DOCUMENTS

EP    0651554 A1 * 10/1995

OTHER PUBLICATIONS

E. Koch & J. Zhao "Towards Robust and Hidden Image Copyright Labeling", Jun. 20-22, 1995, pp. 1-4.*

(Continued)

*Primary Examiner*—Nasser G Moazzami
*Assistant Examiner*—Eleni A Shiferaw
(74) *Attorney, Agent, or Firm*—Fitzpatrick, Cella, Harper & Scinto

(57) ABSTRACT

This invention has as its object to provide a digital watermark processing apparatus, which can embed a digital watermark while minimizing quality deterioration of objective contents. The image segmentation step segments objective contents into a plurality of partial contents. The encryption step encrypts designated one of the plurality of partial contents. The digital watermarking step embeds a digital watermark in the encrypted partial contents by a scheme corresponding to the characteristics or the purpose of use of an image. The decryption step decrypts the encrypted partial contents embedded with the digital watermark. The composition step composites the decrypted partial contents embedded with the digital watermark and other partial contents

9 Claims, 11 Drawing Sheets

U.S. PATENT DOCUMENTS

| | | | | |
|---|---|---|---|---|
| 6,785,814 | B1* | 8/2004 | Usami et al. | 713/176 |
| 6,901,515 | B1* | 5/2005 | Muratani | 713/176 |
| 7,177,429 | B2* | 2/2007 | Moskowitz et al. | 380/252 |
| 2002/0150239 | A1* | 10/2002 | Carny et al. | 380/37 |
| 2003/0079222 | A1* | 4/2003 | Boykin et al. | 725/31 |
| 2003/0161496 | A1* | 8/2003 | Hayashi et al. | 382/100 |
| 2004/0004115 | A1* | 1/2004 | Epstein | 235/375 |
| 2004/0032611 | A1* | 2/2004 | Daly et al. | 358/1.13 |
| 2004/0034781 | A1* | 2/2004 | Natarajan | 713/181 |
| 2004/0059918 | A1* | 3/2004 | Xu | 713/176 |
| 2004/0133924 | A1* | 7/2004 | Wilkins et al. | 725/135 |

OTHER PUBLICATIONS

"Blind Digital Fingerprinting", Iwamura, et al., IEICE Transactions ISEC97-35, Sep. 1997, pp. 63-74 (English Translation enclosed).

"Secure Digital Watermarking Systems for Secondary Distribution" Iwamura, et al., SCIS' 98-10.2F, Jan. 1998, pp. 1 to 8 (English Translation enclosed).

"Storage and Retrieval for Image and Video Databases III" W. Niblack, et al., Proceedings SPIE—The International Society for Optical Engineering, Feb. 9-10, 1995, San Jose, CA, vol. 2420, pp. 164-173.

"A Method of Watermarking under Frequency Domain for Protecting Copyright of Digital Image" T. Nakamura, et al., SCIS'97, The 1997 Symposium on Cryptography and Information Security, Fukuoka, Japan, Jan. 29-Feb. 1, 1997, The Institute of Electronics, Information and Communication Engineers, three pages (including English Abstract).

"A Digital Watermark Based on the Wavelet Transform and its Robustness on Image Compression", H. Inoue, et al., Proceedings of SCIS '98, Jan. 29, 1998, IEEE, pp. 391-395.

"A watermarking scheme to image data by PN sequence" J. Ohnishi, et al., SCIS'97, The 1997 Symposium on Cryptography and Information Security, Fukuoka, Japan, Jan. 29-Feb. 1, 1997, The Institute of Electronics, Information and Communication Engineers, pp. 1-8.

"A Digital Watermark Technique Based on the Wavelet Transform and Its Robustness on Image Compression and Tranformation" H. Inoue, et al., Special Section on Cryptography and Information Security, IEICE Trans. Fundamentals, vol. E82-A, No. 1 Jan. 1999, pp. 2-10.

"On an experimental evaluation of steganography with wavelet transform" H. Ishizuka, et al., SCIS'97, The 1997 Symposium on Cryptography and Information Security, Fukuoka, Japan, Jan. 29-Feb. 1, 1997, The Institute of Electronics, Information and Communication Engineers, pp. 1-10.

\* cited by examiner

DIGITAL WATERMARK PROCESSING APPARATUS, AND DIGITAL CONTENTS DISTRIBUTION SYSTEM USING THE APPARATUS

FIELD OF THE INVENTION

The present invention relates to a digital watermark processing apparatus, information processing apparatus, digital contents distribution system, digital watermarking method, and storage medium that computer-readably stores processing steps for implementing the method, which are used in an apparatus or system for embedding a digital watermark in digital information (digital contents) such as still image data, moving image data, audio data, computer data, computer program, and the like so as to protect their copyrights.

BACKGROUND OF THE INVENTION

In recent years, computers and networks have advanced remarkably, and many kinds of digital data such as text data, image data, audio data, and the like are handled on the computers and networks.

From such digital data (digital information), a copy of data with an equivalent quality can be easily formed. For this reason, to protect the copyrights of data, copyright information, user information, and the like are often embedded as digital watermarks in digital data such as image data, audio data, and the like, which are to undergo copyright protection.

Note that "digital watermarking" is a technique for embedding another information in secrecy in digital data to be processed by a predetermined process.

Therefore, by extracting digital watermark information from digital data embedded with the digital watermark, the copyright information, user information, identification information, and the like of that data can be obtained, and illicit copies can be traced.

As one of conditions required for such digital watermarking, digital watermark information embedded in digital data must be imperceptible; digital watermark information must be able to be embedded with least quality deterioration of source digital data (first condition).

For example, when digital data to be processed is image data, general digital watermarking often adopts schemes that utilize given features of the image, e.g., a scheme for embedding digital watermark information in a high-frequency region by exploiting the human visual characteristics, a scheme of extracting a portion with a large change such as an edge or the like, and embedding digital watermark information around that extracted portion, and so forth.

More specifically, digital watermarking can be roughly classified into two methods, e.g., a method of embedding in the spatial domain and a scheme of embedding in the frequency domain.

Examples of the method of embedding digital watermark information in the spatial domain include schemes described in [W. Bender, D. Gruhl, & N. Morimoto, "Techniques for Data Hiding", Proceedings of the SPIE, San Jose Calif., USA, February 1995], [G. B. Rhoads & W. Linn, "Steganography methods employing embedded calibration data", U.S. Pat. No. 5,636,292], and the like, which employ patchworks.

Examples of the method of embedding digital watermark information in the frequency domain include a scheme [Nakamura, Ogawa, & Takashima, "A Method of Watermarking in Frequency Domain for Protecting Copyright of Digital Image", SCIS' 97-26A, January 1997], which exploits discrete cosine transformation, a scheme [Onishi, Oka, & Matsui, "A Watermarking Scheme for Image Data by PN Sequence", SCIS' 97-26D, January 1997] which exploits discrete Fourier transformation, and schemes [Ishizuka, Sakai, & Sakurai, "Experimental Evaluation of Steganography Using Wavelet Transform", SCIS' 97-26D, January 1997] and [Inoue, Miyazaki, Yamamoto, & Katsura, "A Digital Watermark Technique based on the Wavelet Transform and its Robustness against Image Compression and Transformation", SCIS' 98-3.2.A, February 1998] last two of which exploit discrete wavelet transformation, and the like.

As copyright protection systems that exploit digital watermarking, systems described in [Iwamura, Sakurai, & Imai, "Proposal of Blind Digital Watermarking", IEICE Transactions ISEC97-35], [Iwamura, Sakurai, & Imai, "Secure Digital Watermarking System for Secondary Distribution", SCIS' 98-10.2F], and the like have been proposed. These systems adopt a scheme that does not use a characteristic of an image to embed a digital watermark in encrypted digital contents (image data). Therefore, watermarked image using this system has bad quality.

As the second condition (robustness) required for digital watermarking in addition to the aforementioned first condition (quality), digital watermark information embedded in digital data must remain undisturbed, i.e., embedded digital watermark information must never be lost by editing or attacks such as data compression, a filter process, and the like. Furthermore, the third condition (information size) required for digital watermarking is that the information size of digital watermark information to be embedded must be able to be selected in accordance with purposes of use.

The first to third conditions required for digital watermarking normally have a trade-off relationship. For example, upon implementing robust digital watermarking, relatively large quality deterioration occurs, and the information size of a digital watermark to be embedded becomes small.

Hence, digital watermarking is used in correspondence with various purposes of use due to the presence of such trade-off.

For example, when digital data to be processed is image data which is to be displayed on the screen of a monitor of a personal computer (PC), since the monitor has a low resolution, and the image data can be easily altered by image edit software or the like by the PC, digital watermarking that attaches an importance on robustness rather than quality (image quality) is used for such image data.

In recent years, printers can attain high image quality, and can output images with quality called photo quality. An output image at that time is a printout, and it is not easy to alter that image. Therefore, in such case, digital watermarking that attaches an importance on quality (image quality) is used to have only robustness against print and scan processes.

However, since the aforementioned conventional copyright protection systems that exploit digital watermarking adopt a scheme that does not use a characteristic of an image to embed a digital watermark in encrypted digital contents (image data), high quality (image quality) of the image cannot be assured.

Also, since the first to third conditions required for digital watermarking have a trade-off relationship, as described above, digital watermark processing software programs are present as standalone software programs for respective purposes or as a library of a group of these programs, but no comprehensive system for all of such programs is available.

SUMMARY OF THE INVENTION

The present invention has been made to remove the aforementioned drawbacks, and has as its object to provide a digital watermark processing apparatus, information processing apparatus, digital contents distribution system, digital watermarking method, and storage medium that computer-readably stores processing steps for implementing the method, which can utilize features of contents of digital data (digital contents), i.e., can embed a digital watermark with less quality deterioration of the encrypted contents.

It is another object of the present invention to provide a digital watermark processing apparatus, information processing apparatus, digital contents distribution system, digital watermarking method, and storage medium that computer-readably stores processing steps for implementing the method, which can effectively protect copyrights in a way that the contents proprietor intended, by switching an appropriate digital watermarking method in correspondence with the purposes of use of the contents at the distribution destination of the digital contents, types of devices, or the formats of the contents.

In order to achieve the above objects, according to the present invention, there is provided a system for embedding a digital watermark in contents, comprising segmentation means for segmenting objective contents into a plurality of partial contents, encryption means for encrypting some partial contents of the plurality of partial contents obtained by the segmentation means, digital watermarking means for embedding a digital watermark in the some partial contents of the plurality of partial contents obtained by the encryption means, decryption means for decrypting the partial contents encrypted by the encryption means, and composition means for compositing the partial contents obtained by the decryption means and other partial contents obtained by the segmentation means.

Furthermore, the segmentation means preferably segments the objective contents on the basis of at least one of a frequency band of the objective contents, a feature, and the digital watermarking means.

Furthermore, one apparatus preferably has the respective means.

Furthermore, the system is preferably formed by a plurality of apparatuses.

Furthermore, one apparatus preferably has the respective means.

Furthermore, the first apparatus preferably has the segmentation means, the encryption means, the decryption means, and the composition means, and a second apparatus has the digital watermarking means.

Furthermore, the digital networking means preferably embeds a digital watermark by a scheme corresponding to a purpose of use of the contents.

Furthermore, the purpose of use of the contents preferably includes at least one of a print process and monitor process, and the digital watermarking means embeds a digital watermark having robustness corresponding to the purpose of use.

Furthermore, the purpose of use of the contents preferably includes a process of the objective contents using an apparatus, and the digital watermarking means embeds a digital watermark corresponding to a type of apparatus used.

The system preferably further comprises output means for outputting the objective contents after digital watermarking in a data format corresponding to the type of apparatus used.

Furthermore, the digital networking means preferably embeds a digital watermark by a scheme corresponding to the objective contents.

Furthermore, the digital networking means preferably embeds a digital watermark by a scheme corresponding to a format of the objective contents.

Furthermore, the digital networking means preferably embeds a digital watermark in the partial contents encrypted by the encryption means.

Furthermore, the digital networking means preferably embeds a digital watermark in the partial contents which are not encrypted by the encryption means.

Also, a computer-readable storage medium records a program for making a computer implement the functions of the digital watermark processing apparatus, those of the information processing apparatus, or those of the digital contents distribution system.

Furthermore, a computer-readable storage medium records a program that makes a computer execute the processing steps of the digital watermarking method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be explained in detail hereinafter with reference to the accompanying drawings.

[First Embodiment]

Figure 1:
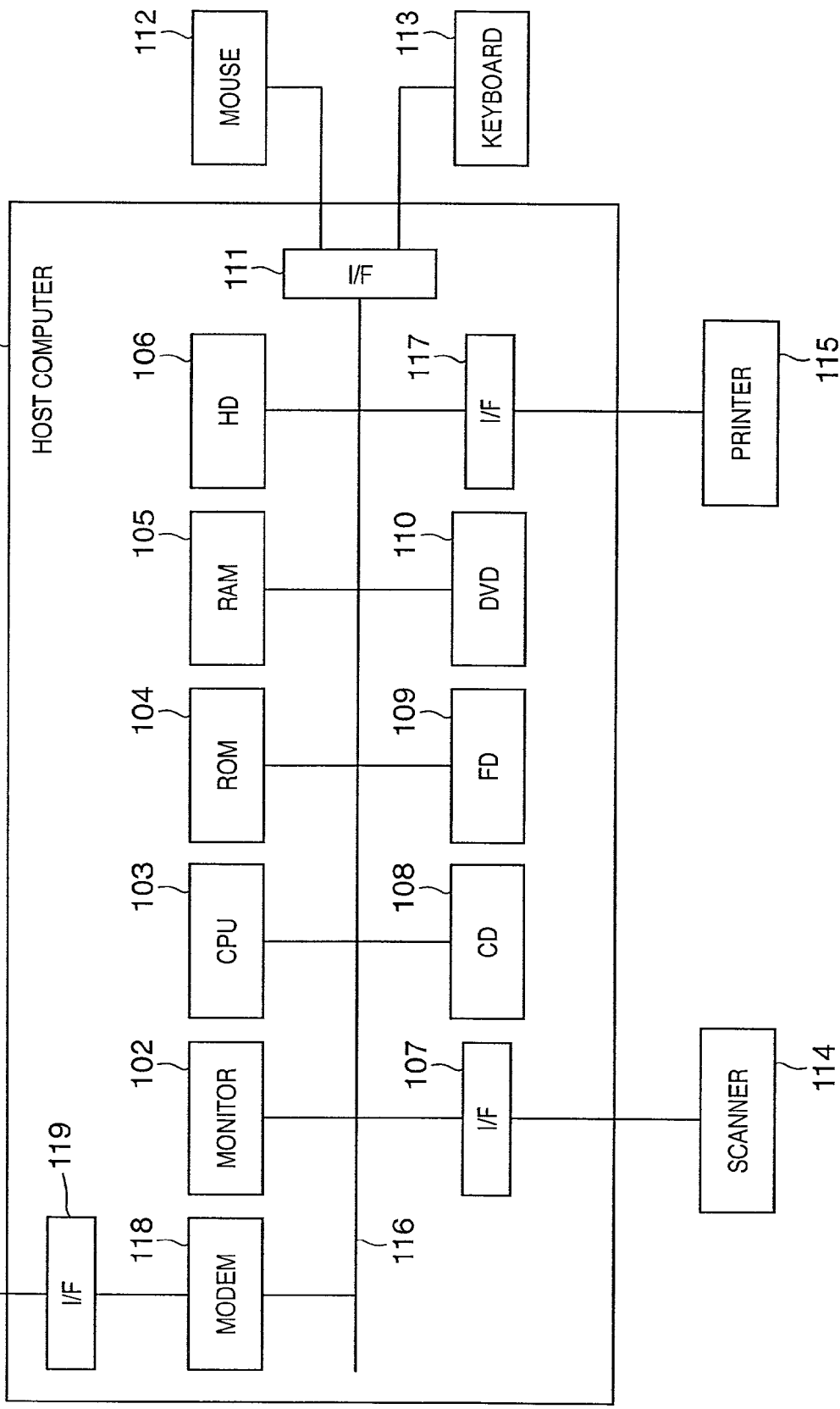
FIG. 1 is a block diagram showing the arrangement of an information processing apparatus to which the present invention is applied in the first embodiment.

The present invention is applied to, e.g., an information processing apparatus 100 shown in FIG. 1.

The information processing apparatus 100 of this embodiment is a terminal apparatus such as a personal computer or the like, and has an arrangement in which a modem 118 to which a network interface 119 is connected, a monitor 102, a CPU 103, a ROM 104, a RAM 105, an HD 106, an interface 111 for a mouse 112 and keyboard 113, an interface 117 for a printer 115, a DVD 110, an FD 109, a CD 108, and an interface 107 for a scanner 114 are connected to each other via a bus 116 to be able to communicate with each other, as shown in FIG. 1.

The CPU 103 executes various processing programs provided from the ROM 104, HD 106, and the like to control the operation of the overall information processing apparatus 100.

The ROM 104 stores processing programs such as an image processing program and the like executed by the CPU 103.

The RAM 105 is used as a temporary data storage, a work area used to execute a processing program by the CPU 103, and the like.

The HD (hard disk) 106 pre-stores processing programs which are transferred to the RAM 104 or the like and are executed by the CPU 103, image data, and the like and can save processed image data and the like.

The scanner 114 reads a document, film, or the like using an image sensing element (CCD or the like) to generate its image data.

The interface (scanner interface) 107 inputs image data obtained by the scanner 114 to the information processing apparatus 100.

The CD (CD-R) 108 is a CD (compact disk) drive equipped as an example of external storage media, and can read data stored in the CD or can write data in the CD.

The FD 109 can read data from an FD (floppy disk) as a storage medium, and can write data in the FD like in the CD 108.

The DVD 110 can read data from a DVD (Digital Versatile disc) as a storage medium, and can write data in the DVD like in the CD 108.

When the storage media such as the CD 108, FD 109, DVD 110, and the like store an image edit program or a processing program such as a printer driver or the like, the CPU 103 reads out the processing program, installs it on the HD 106, and transfers that program onto the RAM 105 as needed.

The interface 111 accepts instructions input from the mouse 112 or keyboard 113, and inputs them to the information processing apparatus 100.

The modem 118 establishes connection to an external network via the interface 119.

The aforementioned information processing apparatus 100 can edit or save image data of a document by reading the document by, e.g., the scanner 114. The information processing apparatus 100 can print the edited image data by the printer 115. The user inputs such operation instructions (various manual instructions) using the mouse 112 or keyboard 113.

Figure 2:
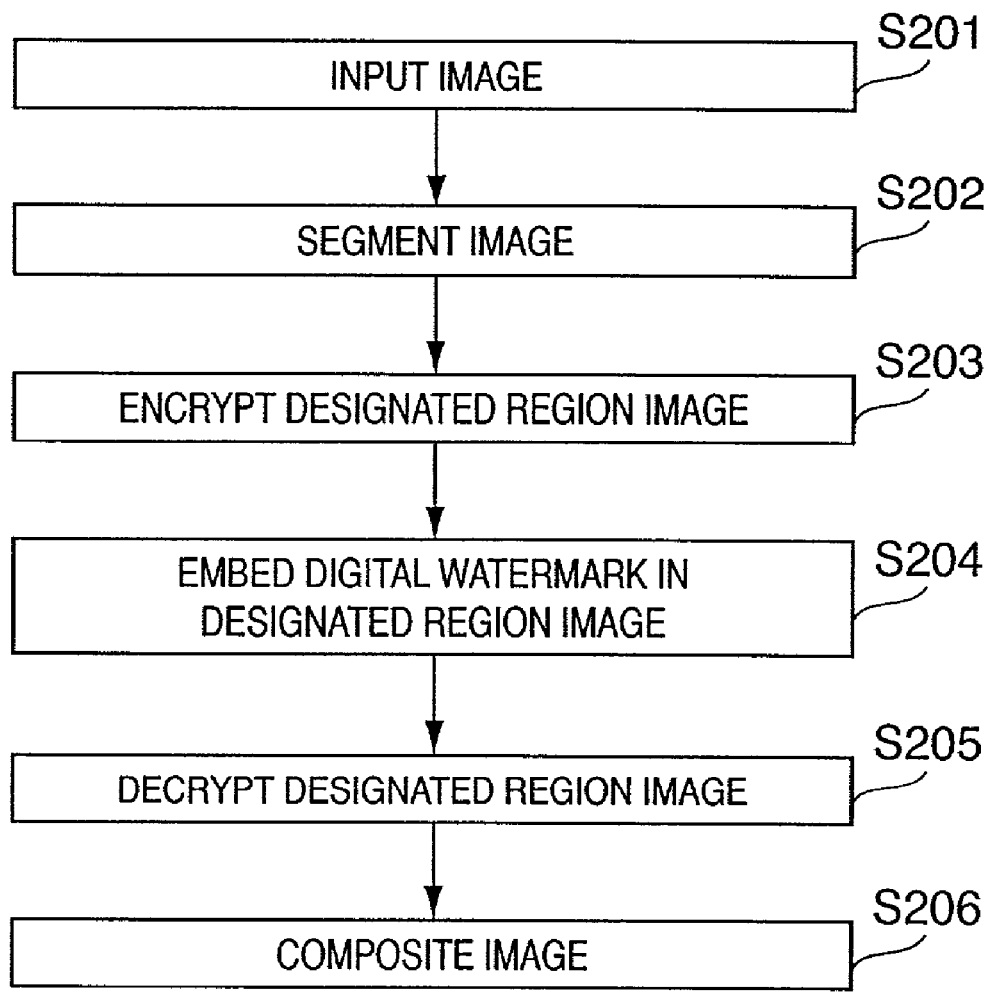
FIG. 2 is a flow chart for explaining the operation of the information processing apparatus.

FIG. 2 shows the operation of the information processing apparatus 100 of this embodiment.

The operation of the information processing apparatus 100 according to the flow chart in FIG. 2 to be described below is implemented when the CPU 103 reads out and executes the processing program according to the flow chart from the ROM 104 or the like. Operation execution instructions at that time can be issued automatically by the processing program or manually using the monitor 102, the mouse 112 or keyboard 113, and the like.

Step S201:

The CPU 103 loads image data to be processed (objective image data) from the HD 106, CD 108, FD 109, or DVD 110 onto the RAM 105.

Step S202:

The CPU 103 segments the objective image data loaded in step S201 in accordance with the digital watermarking scheme used.

For example, when the digital watermarking scheme used in this process is a scheme for embedding digital watermark information in the frequency domain of an objective image, the objective image undergoes frequency transformation such as discrete Fourier transformation, discrete cosine transformation, discrete wavelet transformation, or the like to be segmented into a plurality of frequency band regions. On the other hand, when the digital watermarking scheme used in this process is a scheme for embedding digital watermark information in the spatial domain of an objective image, only a peripheral region of a feature portion such as an edge or the like is separated from the objective image, or the objective image is broken up into a plurality of bit planes.

Step S203:

The CPU 103 encrypts a region image of a designated portion (to be referred to as a "designated region image" hereinafter) from the regions of the objective image segmented in step S202.

The designated region image is an image that includes a region suitable for the digital watermarking scheme used in this process, and is an image of a specific frequency domain or spatial domain depending on the digital watermarking scheme used. As the encryption process, a process for arranging random numbers generated by a pseudo random number generation process in a two-dimensional matrix, and computing the EX-OR of the matrix and the designated region image, or making pixel permutation or the like can be applied. Also, the designated region image may be passed to another apparatus, which encrypts the designated region image, and returns the encrypted image to the information processing apparatus 100.

Step S204:

The CPU 103 embeds digital watermark information in the designated region image encrypted in step S203.

More specifically, for example, when the digital watermarking scheme used in this process is a scheme for embedding digital watermark information in high-frequency components of an objective image, digital watermark information is embedded in the designated region image (encrypted high-frequency image). On the other hand, when the digital watermarking scheme used in this process is a scheme for embedding digital watermark information in a region such as a peripheral portion of an edge or the like of an objective image, digital watermark information is embedded in the designated region image (encrypted image of the edge peripheral portion) on the basis of an image other than the designated region image.

Step S205:

The CPU 103 decrypts the designated region image embedded with the digital watermark information in step S204, i.e., the designated region image which has been encrypted and embedded with the digital watermark information. The decryption process in this step corresponds to the encryption process in step S203. For example, a similar two-dimensional random number matrix is generated by the similar pseudo random number generation process, and the EX-OR of this matrix and the designated region image is calculated, or an inverse permutation process is done. Alternatively, when another apparatus encrypts the image, it may decode the image and may return it to the information processing apparatus 100.

Step S206:

The CPU 103 composites the designated region image decrypted in step S203 and other region images to acquire a final objective image after digital watermarking.

As described above, in this embodiment, an image of a given frequency band which is selected to minimize image quality deterioration is used as the designated region image in which a digital watermark is to be embedded, and the digital watermark is embedded with reference to images of regions other than the designated region image. Hence, the objective image after digital watermarking is nearly free from image quality deterioration, and features of that image can be utilized. In the process shown in FIG. 2, a digital watermark is embedded in encrypted image data, and that data is then decrypted. For this reason, an encryption method which can encrypt a digital watermark to be insusceptible to decryption is selected as in the above example.

In the process shown in FIG. 2, an image in which a digital watermark is to be embedded of the objective image is selected as a designated region image. For example, as shown in FIG. 3, an image in which no digital watermark is embedded may be selected as a designated region image, and a digital watermark may be directly embedded in region images (non-designated region images) other than the designated region image (see step S204' in FIG. 3).

Figure 3:
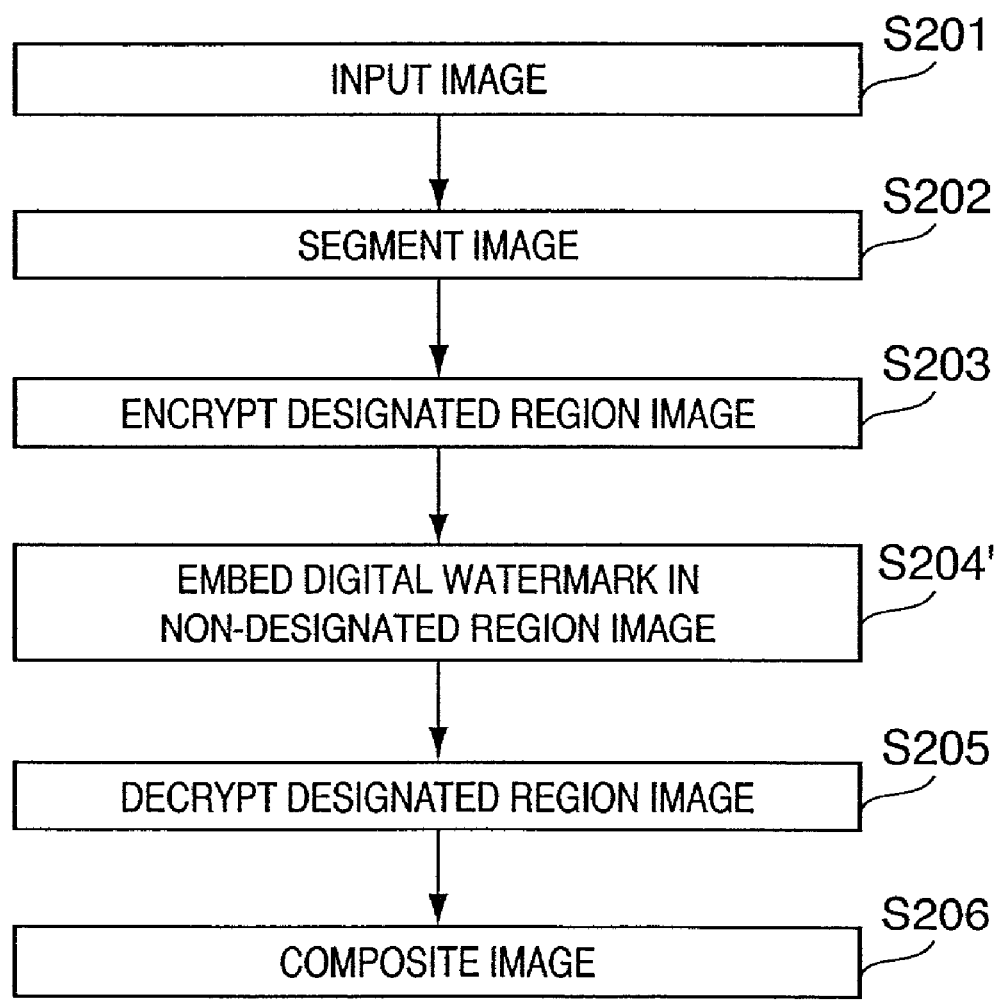
FIG. 3 is a flow chart for explaining another operation of the information processing apparatus.

In the process shown in FIG. 3, the same step numbers denote steps of executing the same processes as in the process shown in FIG. 2, and a detailed description thereof will be omitted. As a merit of the process shown in FIG. 3, since the encrypted designated region image is not changed, an encryption process used in the process is not limited, and an arbitrary processing method can be applied. As for the digital watermarking process, since a digital watermark is directly embedded in a non-encrypted image (non-designated region images), the process can be facilitated. At this time, if regions suitable to embed a digital watermark are selected as the non-designated region images in which the digital watermark is to be embedded, digital watermarking free from image quality deterioration can be implemented as in the process shown in FIG. 2.

Also, the processes shown in FIGS. 2 and 3 may be selectively executed depending on whether or not an image region in which a digital watermark is to be embedded is a portion to be protected when viewed from the proprietor.

Upon segmenting an image (designated region image) in which a digital watermark is to be embedded, the present invention is not limited to a method of segmenting the image based on frequency bands, edge peripheral portion, or the like as a feature. For example, if the image can be segmented based on another feature, an image having that feature is selected as the designated region image in the process in FIG. 2, and as the non-designated region images in the process in FIG. 3.

In the above description, the single information processing apparatus 100 performs segmentation, encryption, digital watermarking, decryption, and composition of an image by itself or only encryption and decryption are made by another apparatus. Alternatively, a first apparatus may perform segmentation and composition, a second apparatus may perform encryption and decryption, and a third apparatus may perform digital watermarking, or respective processes may be done by different apparatuses.

[Second Embodiment]

Figure 4:
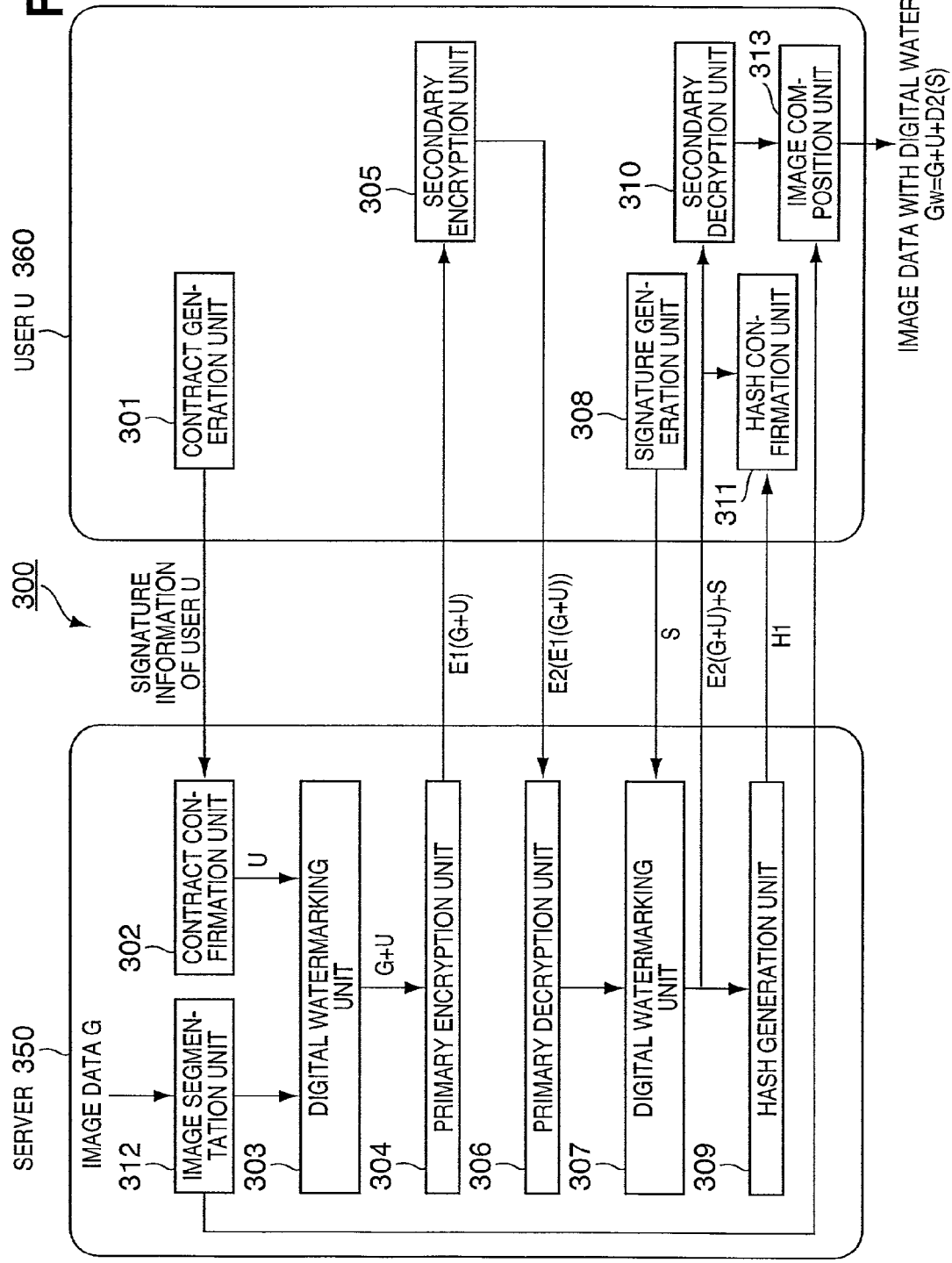
FIG. 4 is a block diagram showing the arrangement of a copyright protection system to which the present invention is applied in the second embodiment.

The present invention is applied to, e.g., a copyright protection system using digital watermarking, as shown in FIG. 4.

A copyright protection system 300 of this embodiment has the digital watermarking function in the information processing apparatus 100 of the first embodiment.

More specifically, the copyright protection system 300 is constructed so that a server 350 and a user terminal 360 are connected to be able to communicate with each other.

The server 350 includes a contract confirmation unit 302, digital watermarking unit 303, primary encryption unit 304, primary decryption unit 306, digital watermarking unit 307, hash generation unit 309, and image segmentation unit 312. An image is provided by the server 350.

The user terminal 360 includes a contract generation unit 301, secondary encryption unit 305, signature generation unit 308, secondary decryption unit 310, hash confirmation unit 311, and image composition unit 313. Since image data is provided by the server 350, the image data that has undergone primary encryption is passed to the user 360. The subsequent processes are substantially the same as in the first embodiment, except that digital watermarking is executed by the server 350.

The aforementioned copyright protection system 300 is characterized by adding the image segmentation unit 312 of the server 350 and the image composition unit 313 of the user terminal 360 to a system described in [Iwamura, Sakurai, & Imai, "Proposal of Blind Digital Watermarking", IEICE Transactions ISEC97-35]. The image segmentation unit 312, digital watermarking unit 307, and image composition unit 313 respectively correspond to the image segmentation function, digital watermarking function, and image composition function in the information processing apparatus 100 of the first embodiment.

In a conventional system (the system described in the above reference) which has neither the image segmentation unit 312 nor the image composition unit 313, since the entire objective image undergoes encryption and digital watermarking, the digital watermarking units 303 and 307 of the server 350 cannot embed a digital watermark in consideration of image quality of the objective image.

By contrast, in the copyright protection system 300 of this embodiment, the image segmentation unit 312 segments an image in accordance with the digital watermarking scheme used in this system, the units 301 to 311 perform an encryption process and digital watermarking process of the designated region image obtained by the image segmentation unit 312, and the image composition unit 313 composites the designated region image and other region images. Hence, a copyright protection system 300 which can implement digital watermarking suffering less image quality deterioration than the conventional system can be built.

[Third Embodiment]

Figure 5:
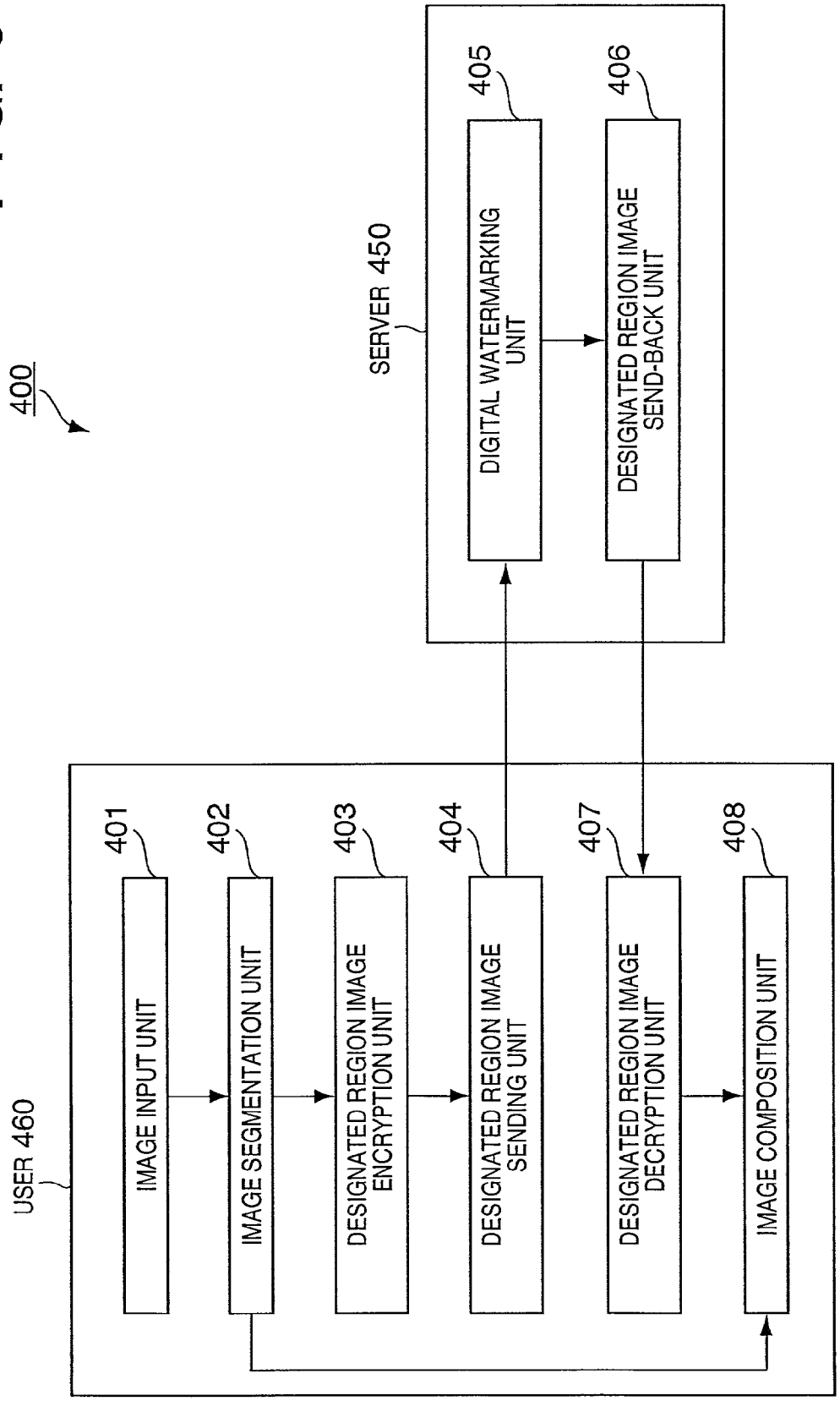
FIG. 5 is a block diagram showing the arrangement of a copyright protection system to which the present invention is applied in the third embodiment.

The present invention is applied to, e.g., a copyright protection system 400 using digital watermarking, as shown in FIG. 5.

The copyright protection system 400 of this embodiment has a digital watermarking function in the information processing apparatus 100 of the first embodiment.

More specifically, in the copyright protection system 400 of this embodiment, a user terminal 460 without any digital watermarking function can make a server 450 having a digital watermarking function embed a digital watermark in an objective image (digital contents) without passing the objective image to the server 450.

The server 450 and user terminal 460 respectively comprise, e.g., computer functions, CPUs of which implement various building components and operations, as will be described later.

The server 450 includes a digital watermarking unit 405 and designated region image send-back unit 406.

The user terminal 460 includes an image input unit 401, image segmentation unit 402, designated image encryption unit 403, designated region image sending unit 404, designated image decryption unit 407, and image composition unit 408.

On the user terminal 460 of the aforementioned copyright protection system 400, the image input unit 401 reads image data to be processed (objective image data) as in step S201 in FIG. 2.

The image segmentation unit 402 segments the objective image data obtained by the image input unit 401 in accordance with the digital watermarking scheme as in step S202 in FIG. 2.

The designated region image encryption unit 403 encrypts a region image of a designated portion (designated region image) of region images of the objective image obtained by the image segmentation unit 402 as in step S203 in FIG. 2.

The designated region sending unit 404 sends the designated region image encrypted by the designated region image encryption unit 403 (encrypted designated region image) to the server 450 via a network such as the Internet or the like using the modem 118 or the like shown in FIG. 1.

Note that the user terminal 460 may also send information to be embedded as a digital watermark to the server 450.

On the server 450, the digital watermarking unit 405 embeds digital watermark information in the encrypted designated region image received from the user terminal 460 as in step S204 in FIG. 2.

The designated region image send-back unit 406 sends the encrypted designated region image embedded with the digital watermark by the digital watermarking unit 405 to the user terminal 460 via a network such as the Internet or the like using the modem 118 or the like shown in FIG. 1.

On the user terminal 460, the designated region image decryption unit 407 decrypts the encrypted designated region image after digital watermarking received from the server 450 as in step S205 in FIG. 2.

The image composition unit 408 composites the designated region image obtained by the designated region image decryption unit 407 and other region images to acquire a final objective image after digital watermarking.

As described above, in this embodiment, since an image that the user terminal 460 passes to the server 450 is an image portion, which corresponds to the digital watermarking process on the server 350 and is suitable for digital watermarking, the user terminal 460 can implement copyright protection by digital watermarking that suffers less image quality deterioration, without passing the digital contents themselves to be processed to the server 450, if it does not have any digital watermarking function.

In this embodiment, the designated region image sending unit 404 of the user terminal 460 sends the encrypted designated region image. For example, when the designated region image is an image, the image quality of which is not so high (e.g., low-frequency image), region images other than the designated region image may also be sent to the server 450, which may execute digital watermarking with reference to non-designated region images.

[Fourth Embodiment]

In the first to third embodiments, image data has been exemplified as digital contents in which a digital watermark is to be embedded. In this embodiment, digital watermarking is executed not only for image data but also for a database (DB).

Figure 6:
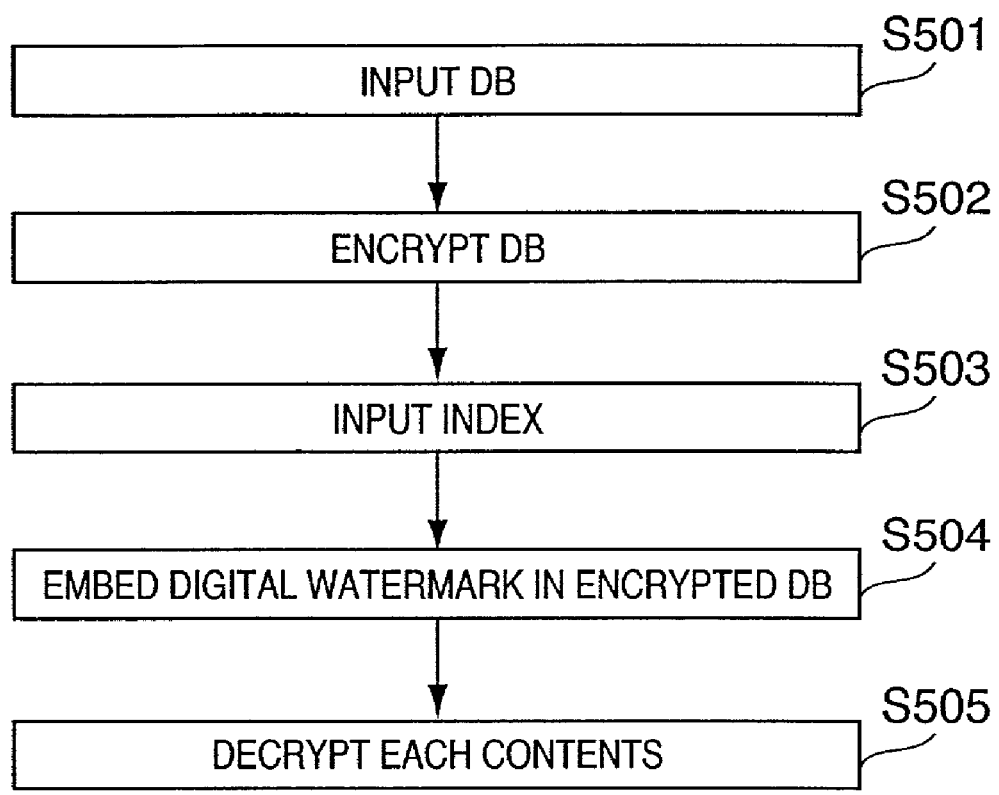
FIG. 6 is a flow chart for explaining the operation of the information processing apparatus in the fourth embodiment.

For this purpose, in this embodiment, the operation of the information processing apparatus 100 in FIG. 1 is modified in accordance with the flow chart shown in FIG. 6.

The CPU 103 reads out contents in the DB to protect the entire DB (step S501), and encrypts all these contents (step S502).

The CPU 103 acquires the index (containing information associated with the contents) of the DB (step S503), and embeds a digital watermark in contents, which require digital watermarking, of those encrypted in step S502 on the basis of the index (step S504). The index information is saved independently of the contents, and describes the necessity/unnecessity of copyright protection for respective contents.

The CPU 103 decrypts each contents used among those which have undergone encryption in step S502 and digital watermarking in step S504 as needed (step S505).

In this embodiment, the contents encrypted in step S502 correspond to the encrypted designated region image in the first embodiment, and the index of the contents corresponds to the non-designated region images in the first embodiment. Therefore, since a digital watermark is embedded in only required contents on the basis of the index, digital watermarking can be implemented while suppressing quality deterioration of the entire DB.

The present invention is effective not only for image data and DB but also for general digital contents such as audio data, text data, and the like, as the digital contents to be processed.

[Fifth Embodiment]

Figure 7:
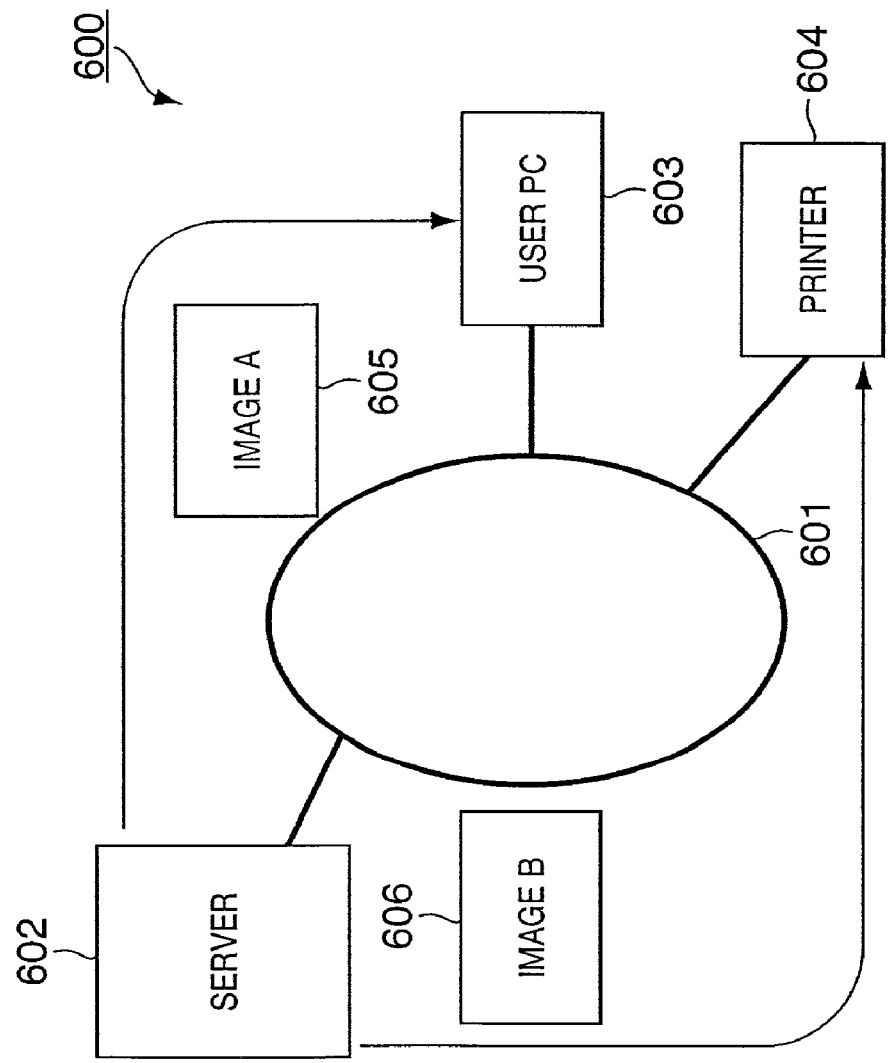
FIG. 7 is a block diagram showing the arrangement of a network system to which the present invention is applied in the fifth embodiment.

The present invention is applied to, e.g., a network system 600 shown in FIG. 7.

The network system 600 of this embodiment has an arrangement in which a server 602, user's terminal 603, and printer 604 are connected via a network 601 such as the Internet or the like to be able to communicate with each other, as shown in FIG. 7.

The server 602 has the functions of the information processing apparatus 100 shown in FIG. 1, and distributes images (digital watermarked images) 605 and 606 obtained by embedding a digital watermark in original images held by the server 602 to the user's terminal 603, printer 604, and the like via the network 601.

The user's terminal 603 (to be also simply referred to as a "user terminal" hereinafter) includes a personal computer (PC) or the like having a monitor, CPU, and the like.

The printer 604 is a printing apparatus used from the user's terminal 603.

In FIG. 7, one server 602, user's terminal 603, and printer 604 are connected to the network 601. However, the number of each of servers, terminals, and printers connected is not limited to one, and a plurality of servers, terminals, and printers may be connected.

Figure 8:
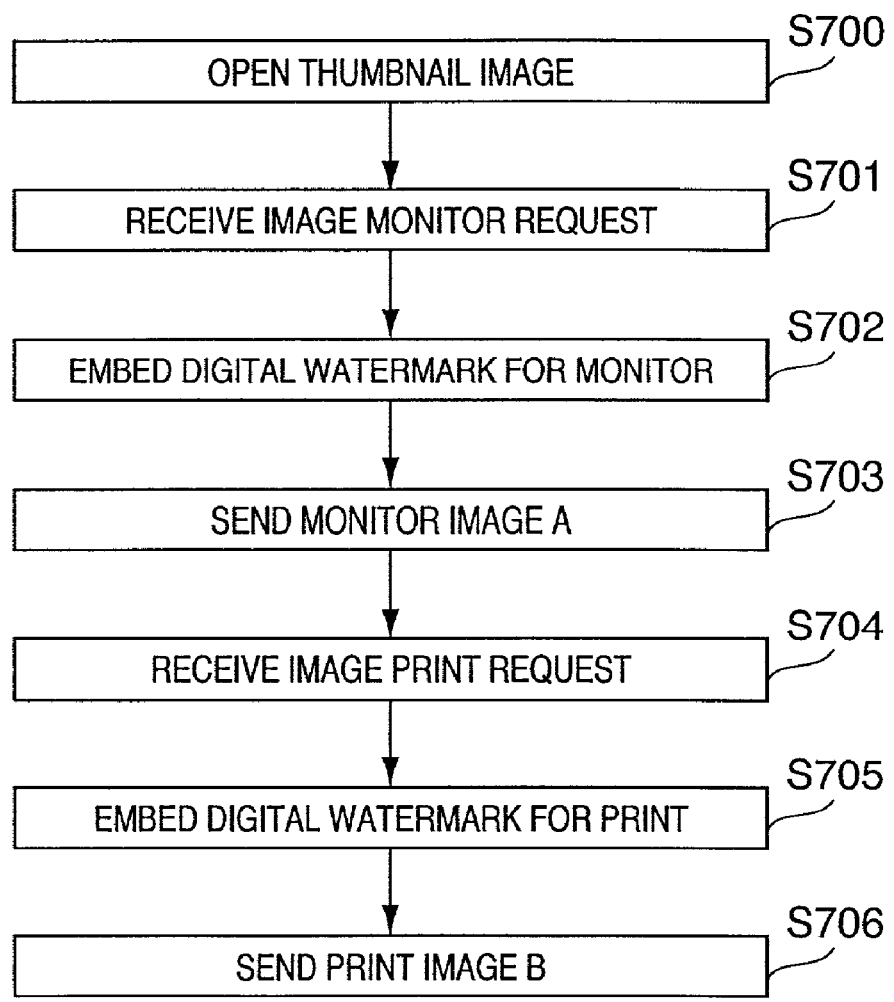
FIG. 8 is a flow chart for explaining the operation of the network system.

A characteristic feature of the aforementioned network system 600 lies in the server 602, and FIG. 8 shows the operation of the server 602 as the characteristic feature.

Step S700:

In the server 602 (see FIG. 1), the CPU 103 opens thumbnails (thumbnail images) of original images held in the HD 106, CD 108, FD 109, DVD 110, or the like to the user terminal 603 via the network 601 using the modem 118 and the like.

The user can access the server 602 from the user terminal 603 via the network 601 and issues a request to view a desired thumbnail image on the monitor of the user terminal 603 to see if he or she likes it.

Step S701:

In the server 602, the CPU 103 receives the request from the user terminal 603 via the network 601 using the modem 118 and the like.

Step S702:

The CPU 103 embeds a digital watermark for monitor in an original image of the thumbnail image designated by the request to generate a digital watermarked image 605 so as to display that image on the user's terminal 603.

The digital watermarking process at that time is executed for an original image loaded on the RAM 105 when the CPU 103 reads out and executes a processing program (a processing program for implementing one of the first to fourth embodiments) pre-stored in the ROM 104 or the like. Also, the user (administrator) of the server 602 may input manual instructions and the like required for that process using the mouse 112, keyboard 113, or the like while observing the monitor 102, or the processing program in the ROM 104 may be set in advance to automatically issue such instructions in response to the request from the user terminal 603.

Step S703:

The CPU 103 sends the digital watermarked image 605 generated in step S702 to the user terminal 603 via the network 601 using the modem 118 and the like. The user terminal 603 receives the image 605 and displays it on the monitor.

In this way, the user confirms the digital watermarked image 605 sent from the server 602 on the monitor of the user terminal 603. After that, when the image 605 is a desired one, and the user wants to print it out, he or she issues a print request to the server 602. This request contains the model, IP address, and the like of the printer (in this case, the printer 604) used in the print process.

Step S704:

In the server 602, the CPU 103 receives the request from the user terminal 603 via the network 601 using the modem 118 and the like. The print request contains information associated with an image selected from the thumbnail images displayed on the server 602 in step S700.

Step S705:

The CPU 103 embeds a digital watermark for print in an original image of the thumbnail image designated by the request from the user terminal 603 to generate a digital watermarked image 606 corresponding to the input format and the like of the printer 604 designated by the request. The digital watermarking process at that time is also executed for an original image loaded on the RAM 105 when the CPU 103 reads out and executes a processing program (a processing program for implementing one of the first to fourth embodiments) pre-stored in the ROM 104 or the like.

Step S706:

The CPU 103 directly sends the digital watermarked image 606 generated in step S705 to the printer 604 via the network 601 in accordance with the IP address and the like of the printer 604 indicated by the request from the user terminal 603.

As a result, the printer 604 executes a print process of the image (digital watermarked image 606) that user wants to print out.

Note that the digital watermark for monitor used in step S702 attaches an importance on robustness rather than quality (image quality) in consideration of alterations of and attacks to a digital image by a PC or the like.

As techniques for improving the digital watermark robustness, a technique for repetitively embedding a single digital watermark, a technique for appending an error correction code to data that represents a digital watermark, and the like may be used. Also, the robustness can be improved by exploiting the statistical nature of digital watermark data. Furthermore, by embedding a digital watermark over a broader spatial frequency component range of an image, the digital watermark robustness can be improved.

As described above, since this embodiment uses a digital watermark that attaches an importance on robustness rather than quality as that for monitor, even when the user terminal 603 prints out the digital watermarked image 605 embedded with the digital watermark for monitor, only a low-image quality print result is obtained. Even when the user terminal 603 alters the digital watermarked image 605 using a PC, since the digital watermark has high robustness, the digital watermark is hard to destroy, and the copyrights of the digital watermarked image 605 can be securely protected.

On the other hand, the digital watermark for print used in step S705 attaches an importance on higher image quality although it has only robustness against print and scan processes. For example, a technique for embedding a watermark in high-frequency components or a peripheral portion of an edge region of an image, which is imperceptible to the human eye, is suitable for digital watermarking in step S705.

Therefore, the digital watermarked image 606 embedded with the digital watermark for print can be printed out as an image with quality called photo quality. The digital watermarked image 606 is not sent to the user terminal 603 but directly to the printer 604. Hence, that image is converted into rasterized data having a data format corresponding to the printer used in the print process (the printer 604 in this case), and the converted data is sent. Hence, it becomes very difficult for the user terminal 603 to alter that data using a PC or the like.

Note that the digital watermarking scheme that attaches an importance on robustness rather than quality in this embodiment is not limited to the aforementioned scheme, and various other schemes may be used. Also, the digital watermarking scheme that attaches an importance on higher image quality although robustness is lowered is not limited to the aforementioned scheme, either, and various other schemes may be applied.

As described above, according to this embodiment, copyright protection of digital contents the server 602 (or proprietor) intended can be implemented with the best quality corresponding to the purpose of use.

[Sixth Embodiment]

Figure 9:
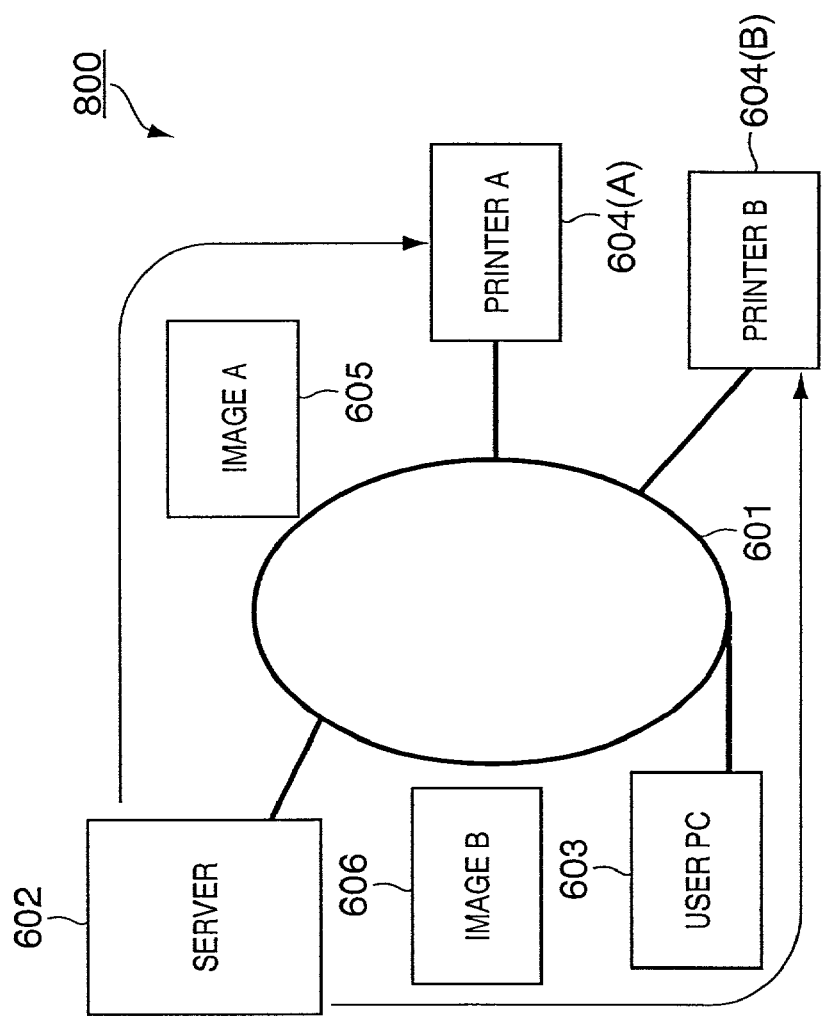
FIG. 9 is a block diagram showing the arrangement of a network system to which the present invention is applied in the sixth embodiment.

The present invention is applied to, e.g., a network system 800 shown in FIG. 9.

In the network system 600 (see FIG. 7) of the fifth embodiment, the server 602 selectively uses the digital watermark for monitor and that for print in correspondence with the purpose of use on the user terminal 603. By contrast, in the network system 800 (see FIG. 9) of this embodiment, the server 602 selectively uses digital watermarks corresponding not only to monitor and print purposes but also to various purposes of use, and also selectively uses some digital watermarks in correspondence with a model of printer or the like that prints out an image even in the same category of purpose of use.

Note that the same reference numerals in the network system 800 shown in FIG. 9 denote the same components as those in the network system 600 in FIG. 7, and a detailed description thereof will be omitted.

The network system 800 of this embodiment shown in FIG. 9 has an arrangement in which two printers 604(A) and 604(B) having different characteristics are connected.

Figure 10:
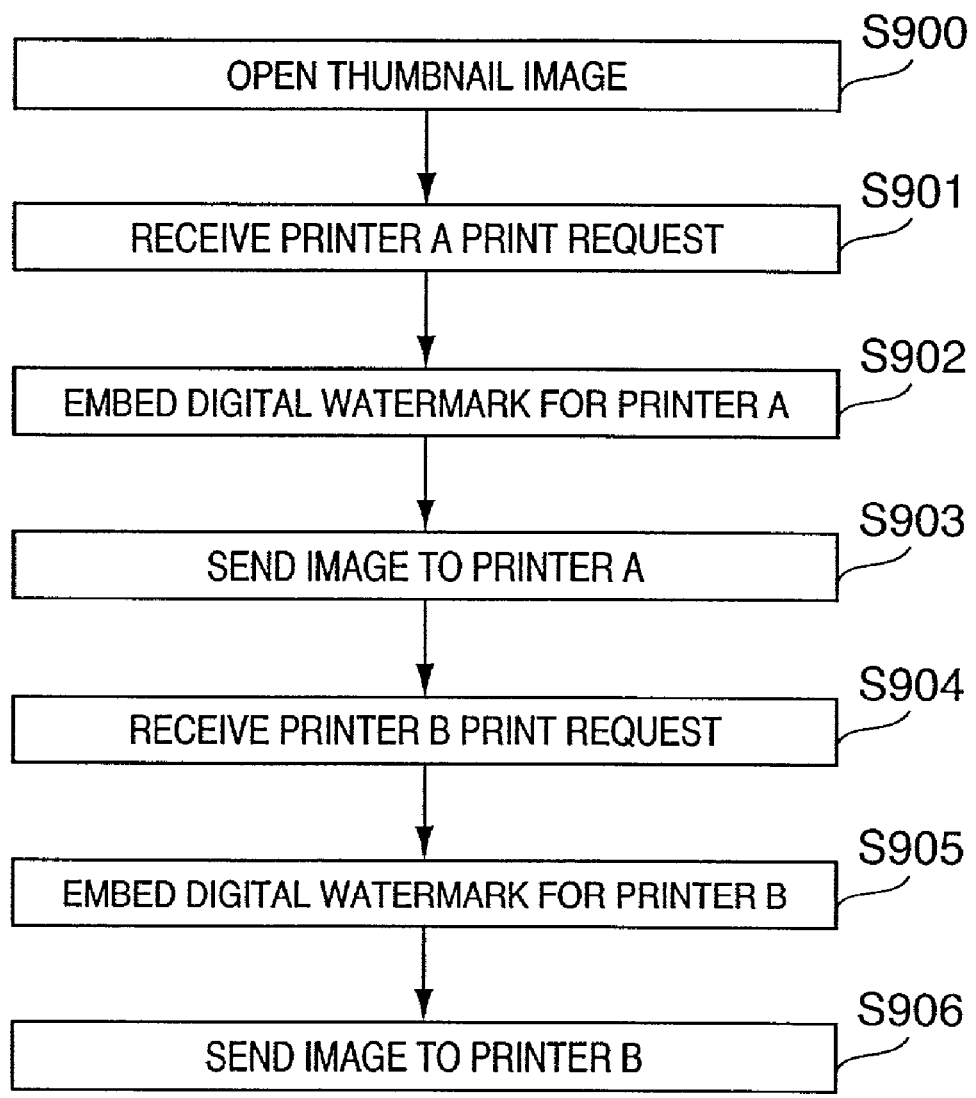
FIG. 10 is a flow chart for explaining the operation of the network system.

FIG. 10 shows the operation of the server 602 in this embodiment.

Step S900:

In the server 602 (see FIG. 1), the CPU 103 opens thumbnails (thumbnail images) of original images held in the HD 106, CD 108, FD 109, DVD 110, or the like to the user terminal 603 via the network 601 using the modem 118 and the like.

The user can access the server 602 from the user terminal 603 via the network 601 and issues a request to print a desired thumbnail image using a desired printer (printer 604(A) in this case). The request at that time contains information such as the model, IP address, and the like of the printer (printer 604(A)) that prints on the user terminal 603.

Step S901:

In the server 602, the CPU 103 receives the print request using the printer 604(A) from the user terminal 603 via the network 601 using the modem 118 and the like.

Step S902:

The CPU 103 embeds a digital watermark for print using the printer 604(A) in an original image of the thumbnail image designated by the print request using the printer 604(A) from the user terminal 603 on the basis of the model information of the printer contained in the received print request, thus forming a digital watermarked image 605 corresponding to the input format and the like of the printer 604(A).

Step S903:

The CPU 103 directly sends the digital watermarked image 605 generated in step S902 to the printer 604(A) via the network 601 using the modem 118 and the like in accordance with the IP address and the like of the printer 604(A) designated by the request from the user terminal 603.

In this way, the printer 604(A) executes a print process of the image (digital watermarked image 605) that the user wants to print.

Step S904:

The user can access the server 602 from the user terminal 603 via the network 601 as needed and issues a request to print a desired thumbnail image using a desired printer (printer 604(B) in this case). The request at that time contains information such as the model, IP address, and the like of the printer (printer 604(B)) that prints on the user terminal 603.

In the server 602, the CPU 103 receives the print request using the printer 604(B) from the user terminal 603 via the network 601 using the modem 118 and the like.

Step S905:

The CPU 103 embeds a digital watermark for print using the printer 604(B) in an original image of the thumbnail image designated by the print request using the printer 604(B) from the user terminal 603 on the basis of the model information of the printer contained in the received print request, thus forming a digital watermarked image 606 corresponding to the input format and the like of the printer 604(B).

Step S906:

The CPU 103 directly sends the digital watermarked image 606 generated in step S905 to the printer 604(B) via the network 601 using the modem 118 and the like in accordance with the IP address and the like of the printer 604(B) designated by the request from the user terminal 603.

In this way, the printer 604(B) executes a print process of the image (digital watermarked image 606) that the user wants to print.

Note that the difference of the characteristics of the printers 604(A) and 604(B) is that, for example, the printer 604(A) is an ink-ejection type printer such as a BJ printer, ink-jet printer, or the like, and the printer(B) is an electrophotography printer such as an LBP or the like. In such case, since the printers 604(A) and 604(B) have different print systems, different optimal digital watermarking schemes must be used to guarantee the best qualities (image qualities) of the respective printers. Hence, in this embodiment, even in the same category of purpose of use, i.e., "print", the server 602 selectively uses a digital watermark corresponding to the type of printer, thus building a system that can effectively exploit the characteristics of digital watermarks. For example, in an LBP, since a laser beam has undergone pulse-width modulation, high-frequency components in the main scan direction of the laser beam are readily lost from the printed image. For this reason, a digital watermark is embedded in frequency components other than those lost by the print process. By contrast, since high-frequency components tend to remain on a printout by an ink-jet printer, a digital watermark can be embedded in the high-frequency components.

In this embodiment, the print requests from the single user 603 are received in steps S901 and S904, but requests from different users may be received.

[Seventh Embodiment]

In this embodiment, the server 602 switches a digital watermark in correspondence with the format of digital contents to be processed in the network system 800 (see FIG. 9) of the sixth embodiment.

More specifically, an image which is to be printed with high image quality is normally a multi-valued image, but a text document or the like is a binary image (to be referred to as a "document image" hereinafter) consisting of only black and white. Since the multi-valued image has large redundancy, but the document image has small redundancy, different digital watermarking schemes must be used for these images.

Figure 11:
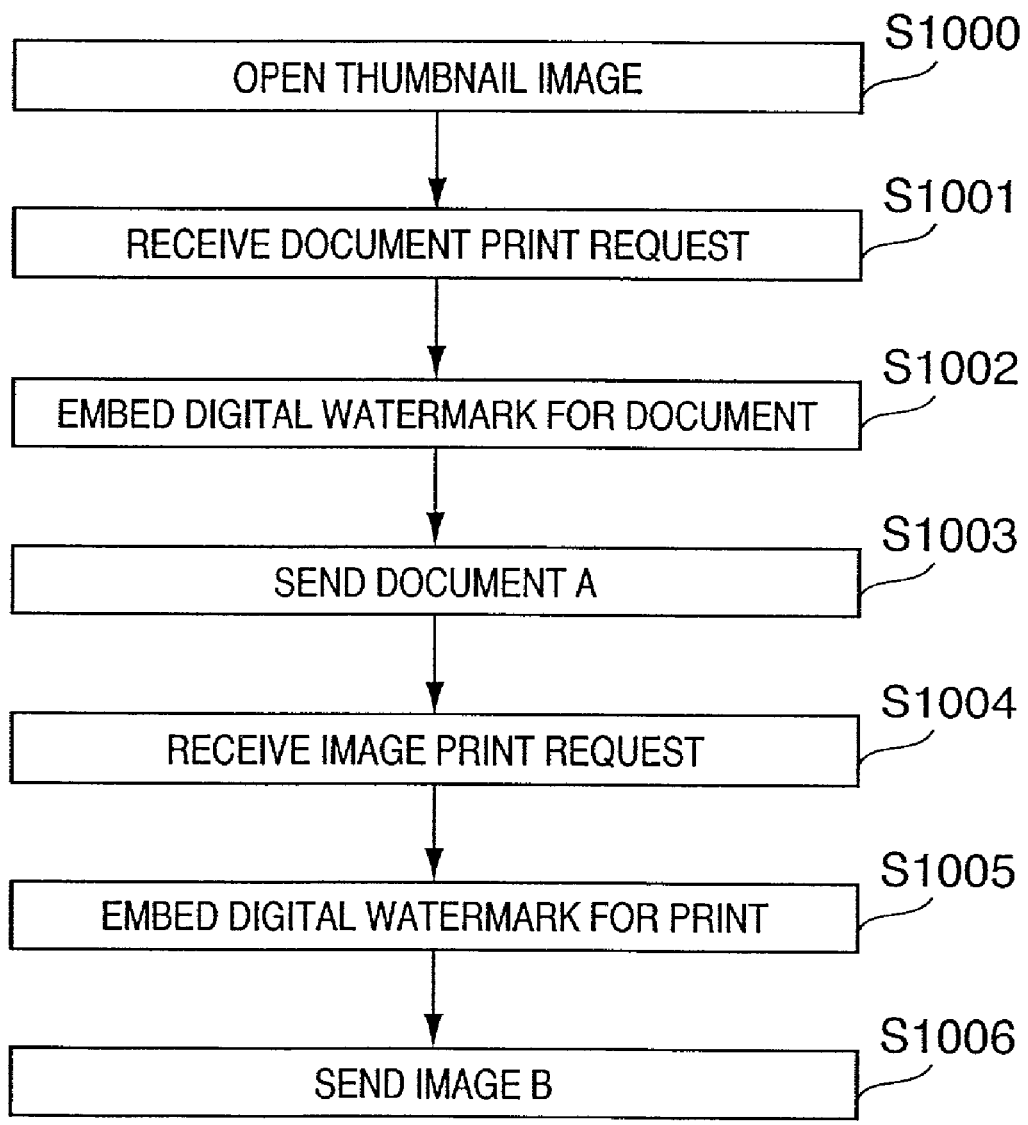
FIG. 11 is a flow chart for explaining the operation of the network system in the seventh embodiment.

FIG. 11 shows the operation of the server 602 of the network system 800 in this embodiment.

Step S1000:

In the server 602 (see FIG. 1), the CPU 103 opens thumbnails (thumbnail images) of original images held in the HD 106, CD 108, FD 109, DVD 110, or the like to the user terminal 603 via the network 601 using the modem 118 and the like.

The user can access the server 602 from the user terminal 603 via the network 601 and issues a request to print a desired thumbnail image (in this case, a thumbnail image of a document image) using a desired printer (printer 604(A) in this case). The request at that time contains information such as the model, IP address, and the like of the printer (printer 604(A)) that prints on the user terminal 603.

Step S1002:

The CPU 103 embeds a digital watermark for binary image in an original image (document image) of the thumbnail image designated by the request from the user terminal 603, thus forming a digital watermarked image (document image) 605 corresponding to the input format and the like of the printer 604(A). As a technique for embedding a digital watermark for binary image, a technique for embedding a digital watermark in a gap between, e.g., text objects, is available.

Step S1003:

The CPU 103 directly sends the digital watermarked image (document image) 605 generated in step S1002 to the printer 604(A) via the network 601 using the modem 118 and the like in accordance with the IP address and the like of the printer 604(A) designated by the request from the user terminal 603.

In this way, the printer 604(A) executes a print process of the document image (digital watermarked image 605) that the user wants to print.

Step S1004:

The user can access the server 602 from the user terminal 603 via the network 601 as needed and issues a request to print a desired thumbnail image (in this case, a thumbnail image of a multi-valued image) using a desired printer (printer 604(B) in this case). The request at that time contains information such as the model, IP address, and the like of the printer (printer 604(B)) that prints on the user terminal 603.

Step S1005:

The CPU 103 embeds a digital watermark for print using the printer 604(B) in an original image (multi-valued image) of the thumbnail image designated by the request from the user terminal 603, thus forming a digital watermarked image (multi-valued image) 606 corresponding to the input format and the like of the printer 604(B).

Step S1006:

The CPU 103 directly sends the digital watermarked image (multi-valued image) 606 generated in step S1005 to the printer 604(B) via the network 601 using the modem 118 and the like in accordance with the IP address and the like of the printer 604(B) designated by the request from the user terminal 603.

In this way, the printer 604(B) executes a print process of the multi-valued image (digital watermarked image 606) that the user wants to print.

In the first to seventh embodiments, digital contents to be processed are mainly images (multi-valued or binary images). However, the present invention is not limited to such specific contents, and can be applied to various other digital contents such as movies, audio data, and the like.

In the fifth to seventh embodiments, the server selectively uses digital watermarks in correspondence with the purpose of use of digital contents, the model of apparatus that processes digital contents, the format of digital contents, and the like. Also, the server may selectively use digital watermarks in correspondence with a combination pattern of them.

The objects of the present invention are also achieved by supplying a storage medium, which records a program code of a software program that can implement the functions of the first to seventh embodiments to a system or apparatus, and reading out and executing the program code stored in the storage medium by a computer (or a CPU or MPU) of the system or apparatus.

In this case, the program code itself read out from the storage medium implements the functions of the first to seventh embodiments, and the storage medium which stores the program code constitutes the present invention.

As the storage medium for supplying the program code, for example, a ROM, floppy disk, hard disk, optical disk, magneto-optical disk, CD-ROM, CD-R, magnetic tape, nonvolatile memory card, and the like may be used.

The functions of the first to seventh embodiments may be implemented not only by executing the readout program code by the computer but also by some or all of actual processing operations executed by an OS (operating system) running on the computer on the basis of an instruction of the program code.

Furthermore, the functions of the first to seventh embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, objective contents are segmented into a plurality of partial contents, given partial contents selected by, e.g., designation, of the plurality of partial contents are encrypted, a digital watermark is embedded in the encrypted partial contents, the encrypted partial contents after digital watermarking are decrypted, and the decrypted partial contents after digital watermarking and other partial contents are composited to acquire the objective contents embedded with the digital watermark. In this manner, for example, when the objective contents are an arbitrary image, the image is segmented into a plurality of partial images (partial contents), an image of a frequency band selected to minimize image quality deterioration is used as a partial image, in which a digital watermark is to be embedded, of these partial images, the partial image undergoes encryption, digital watermarking, and decryption, and the processed partial image is composited to other partial images, thus providing an image embedded with the digital watermark which is free from image quality deterioration and can utilize distinctive features of each specific image.

Therefore, according to the present invention, digital watermarking that suffers less quality deterioration can be implemented even for encrypted contents by utilizing features of original contents. When such digital watermarking is applied to a digital contents copyright protection system, a copyright protection system that can provide high-quality contents can be built.

In the present invention, a plurality of different digital watermarking schemes (means) (e.g., a digital watermarking scheme which attaches an importance on robustness, that which attaches an importance on image quality, and the like) are switched on the basis of the purpose of use of contents, the type of apparatus used to process contents, the format of contents, and the like. In this way, optimal digital watermarking can be selectively implemented in correspondence with the purpose of use of contents, the type of apparatus used to process contents, the format of contents, and the like.

Hence, according to the present invention, a system, in which the server selectively uses standalone digital watermarking software programs or a library as a group of such software programs in correspondence with the purpose of use of contents on the user terminal, the type of apparatus used to process contents on the user terminal, the format of contents that the user terminal requires, or the like, can be built. As a result, a system that can protect the copyrights of contents in a form that the server (proprietor) intended can be built.

The present invention is not limited to the above embodiments and various changes and modifications can be made within the spirit and scope of the present invention. Therefore, to apprise the public of the scope of the present invention the following claims are made.

What is claimed is:

1. A system having a server and a terminal in communication with each other for embedding a digital watermark in content, wherein the server comprises:

a segmentation unit configured to segment the content into a plurality of partial contents;

a watermarking unit configured to embed a digital watermark in at least one partial content segmented in said segmentation unit to obtain a watermarked partial content;

a primary encryption unit configured to primarily encrypt the watermarked partial content to obtain a primarily encrypted partial content;

a first transmission unit configured to transmit the primarily encrypted partial content, and other partial contents in which a watermark is not embedded in said watermarking unit, to the terminal;

a primary decryption unit configured to primarily decrypt double encrypted partial content transmitted from the terminal to obtain secondarily encrypted partial content; and a second transmission unit configured to transmit the secondarily encrypted partial content to the terminal, and the terminal comprises:

a secondary encryption unit configured to secondarily encrypt the primarily encrypted partial content to obtain the double encrypted partial content;

a third transmission unit configured to transmit the double encrypted partial content to the server;

a secondary decryption unit configured to secondarily decrypt the secondarily encrypted partial content to generate watermarked plain partial content in which the digital watermark is embedded and which is not encrypted; and a synthesis unit configured to synthesize the watermarked plain partial content generated by said secondary decryption unit and other partial contents transmitted from the server by the first transmission unit.

2. The system according to claim 1, wherein said segmentation unit segments the content on the basis of at least one of a frequency band of the content, a feature of the content, and a type of said digital watermarking unit.

3. The system according to claim 1, wherein said digital watermarking unit embeds a digital watermark by a scheme corresponding to a purpose of use of the content.

4. The system according to claim 3, wherein the purpose of use of the content includes at least one of a print process and monitor process, and said digital watermarking unit embeds a digital watermark having robustness corresponding to the purpose of use.

5. The system according to claim 3, wherein the purpose of use of the content includes a process of the content using an apparatus, and said digital watermarking unit embeds a digital watermark corresponding to a type of the apparatus used.

6. The system according to claim 5, further comprising an output unit for outputting the content after digital watermarking in a data format corresponding to the type of the apparatus used.

7. The system according to claim 1, wherein said digital watermarking unit embeds a digital watermark by a scheme corresponding to the content.

8. The system according to claim 1, wherein said digital watermarking unit embeds a digital watermark by a scheme corresponding to a format of the content.

9. A method for embedding a digital watermark in contents by a system having a server and a terminal in communication with each other, said method, comprising the steps of:

in the server, segmenting the contents into a plurality of partial contents;

in the server, embedding a digital watermark in at least one partial content segmented in said segmenting step to obtain a watermarked partial content;

in the server, primarily encrypting the watermarked partial content to obtain a primarily encrypted partial content;

in the server, transmitting the primarily encrypted partial content, and other partial contents in which a watermark is not embedded, to the terminal;

in the terminal, secondarily encrypting the primarily encrypted partial content to obtain a double encrypted partial content;

in the terminal, transmitting the double encrypted partial content to the server;

in the server, primarily decrypting the double encrypted partial content transmitted from the terminal to obtain secondarily encrypted partial content;

in the server, transmitting the secondarily encrypted partial content to the terminal, in the terminal, secondarily decrypting the secondarily encrypted partial content to generate watermarked plain partial content in which the digital watermark is embedded and which is not encrypted; and in the terminal, synthesizing the watermarked plain partial content generated in the secondarily decrypting step and other partial content transmitted from the server in which a watermark is not embedded.

* * * * *